United States Patent [19]

Shihabi

[11] 4,448,673

[45] May 15, 1984

[54] AGING RESISTANCE SHAPE SELECTIVE CATALYST WITH ENHANCED ACTIVITY

[75] Inventor: David S. Shihabi, Pennington, N.J.

[73] Assignee: Mobil Oil Corporation, New York, N.Y.

[21] Appl. No.: 426,029

[22] Filed: Sep. 28, 1982

Related U.S. Application Data

[62] Division of Ser. No. 331,117, Dec. 16, 1981, Pat. No. 4,402,866.

[51] Int. Cl.³ ...................... C10G 11/05; C10G 47/20
[52] U.S. Cl. .................................... 208/111; 208/120; 208/216 R; 208/251 H; 208/254 H; 585/671; 585/739
[58] Field of Search ........................... 208/111, 120

[56] References Cited

U.S. PATENT DOCUMENTS 3,541,027  11/1970  Lapides ........................ 252/455 Z
3,755,145   8/1973  Orkin ........................... 208/111
4,257,872   3/1981  La Pierre et al. ............. 208/59
4,263,129   4/1981  Chen et al. .................... 208/111
4,269,697   5/1981  Chen et al. .................... 208/120
4,315,814   2/1982  Shihabi ......................... 208/111

Primary Examiner—Delbert E. Gantz
Assistant Examiner—O. Chaudhuri
Attorney, Agent, or Firm—Alexander J. McKillop; Michael G. Gilman; Charles J. Speciale

[57] ABSTRACT

A shape selective catalyst useful in a variety of hydrocarbon conversion processes such as cracking, hydrocracking, hydrofining, isomerization, dewaxing, and the like, is obtained from the process which comprises steaming a precursor crystalline aluminosilicate in the hydrogen or ammonium form having a silica-alumina ratio greater than 12, a constraint index between about 1 and about 12 and an alpha value greater than about 20 in the presence of ammonia to provide a crystalline aluminosilicate having an alpha value of from about 10 to about 150 and thereafter ion-exchanging the steamed precursor with an alkali metal cation under conditions effective to further reduce the alpha value of the crystalline aluminosilicate to less than about 10.

3 Claims, No Drawings

AGING RESISTANCE SHAPE SELECTIVE CATALYST WITH ENHANCED ACTIVITY

This is a division of copending application Ser. No. 331,117, filed Dec. 16, 1981, now U.S. Pat. No. 4,402,866.

BACKGROUND OF THE INVENTION

This invention concerns a modified high silica-to-alumina ratio acidic crystalline zeolite catalyst of a special group such a ZSM-5 having increased activity and decreased aging rate when employed in a variety of hydrocarbon conversion processes.

It is well known in the petroleum refining art to improve the quality of various hydrocarbon oils by treating them with catalysts under varying conversion conditions to effect such reactions as cracking, hydrocracking, hydrofining, isomerization, dewaxing, and the like. In these processes, operating catalyst life usually depends on the nature of feedstock, the severity of the operation and often, on the nature and the extent of operational upsets. Gradual catalyst deactivation is countered by incrementally raising the operating temperature to maintain the required conversion.

Numerous investigators have demonstrated that the activity of silica-alumina and clays used in various acid-type catalytic reactions depends in part on the degree of hydration of the surface. The effect of water on hydrocracking was reported by T. Y. Yan (see *Journal of Catalysis* 25, 204–211 (1972)). Yan evaluated the addition of water, introduced as 2-pentanol or water vapor, on the hydrocracking activities of palladium impregnated rare earth exchanged zeolite X and a platinum impregnated zeolite HY. The addition of 3 wt % 2-pentanol to the feed or saturating the feed with water vapor at 75% reduced the temperature required for a 60% conversion of n-hexadecane by 12° F. Yan further showed that the activation was due to water and not by the pentene produced by the dehydration of 2-pentanol. The promotional effect of water on the hydroprocessing of a commercial feedstock was found to be minimal. Furthermore, water failed to promote zeolite HY. Minachev, et al. have reported in *Soviet Scientific Reviews*, Section B., Chemistry Reviews, Vol. 2, 1–6 (1980) that sodium forms of zeolites are not promoted by water. In addition, Ward (*Journal of Catalysis*, 11,238–250 (1968) studied the influence of small amounts of water on the acidity of several alkali, alkaline earth, hydrogen and mixed cation zeolites by observing changes in the infrared spectrum of chemisorbed pyridine. Water had no marked effect on the acidity of alkali cation X and Y zeolites.

Water and water precursors have also been disclosed in the patent art as useful in enhancing catalytically promoted petroleum processes. Water has been disclosed as enhancing the activity of metal catalysts supported on inorganic metal oxide supports in such processes as reforming (U.S. Pat. Nos. 2,642,383 to Berger, et al. and 3,649,524 to Derr, et al.), hydrodesulfurization (U.S. Pat. No. 3,720,602 to Riley, et al.); dehydrogenation (U.S. Pat. No. 3,907,921 to Winter) and hydrocracking (U.S. Pat. No. 4,097,364 to Egan). In addition, water has been found useful in petroleum processing in promoting the activity of crystalline aluminosilicates, such as zeolite X and Y (U.S. Pat. Nos. 3,943,490 to Plank, et al. (cracking); 3,546,100 to Yan (hydrocracking) and 4,097,364 to Egan (hydrocracking) and ZSM-5 (U.S. Pat. No. 4,149,960 to Garwood, et al. (dewaxing). Garwood, et al. disclose that dewaxing of gas oils wth a ZSM-5 type zeolite in hydrogen form is enhanced by cofeeding water with the gas oil feed. The benefits obtained are improvements in coke laydown and catalyst aging rates. There is no suggestion that a sodium exchanged ZSM-5 type zeolite has catalytic dewaxing capability or that the presence of water would benefit such a zeolite.

In some particular petroleum conversion processes involving cracking a certain class of compounds in a feedstock may be converted to modify a characteristic of the whole feedstock. Exemplary of the latter type of conversion is catalytic hydrodewaxing whose principal purpose is to reduce the pour point of wax containing mineral oils. Pour point is the temperature at which an oil will not flow, as determined by standardized test procedures. The waxy compounds are long carbon chain molecules which tend to crystallize on cooling of the oil to an extent such that it will not flow, hence it may not be pumped or transported by the pipelines at ambient temperatures.

Catalytic dewaxing as practiced today involves the shape selective conversion of straight and slightly branched aliphatic compounds of 12 or more carbon atoms, viz, the waxy molecule, to reduce the pour point, pumpability and/or viscosity of mineral oil fractions which contain these waxy constituents.

Particularly effective catalysts for catalytic dewaxing include zeolite ZSM-5 and related porous crystalline aluminosilicates as described in U.S. Pat. No. Re. 28,398 of Chen, et al. As described in that patent, drastic reductions in pour point are achieved by catalytic shape selective conversion of the wax content of heavy stocks with hydrogen in the presence of a dual-functional catalyst of a metal plus the hydrogen form of ZSM-5. The conversion of waxes is by scission of carbon to carbon bonds (cracking) and production of products of lower boiling point than the waxes. However, only minor conversion occurs in dewaxing. For example, Chen et al. describe hydrodewaxing of a full range shale oil having a pour point of +80° F. to yield a pumpable product of pour point at −15° F. The shift of materials from the fraction heavier than light fuel oil to lighter components was in the neighborhood of 9% conversion.

Among the less specialized techniques for producing products of lower molecular weight than the hydrocarbon charge stock are catalytic cracking and catalytic hydrocracking. Catalytic cracking involves contacting the heavy hydrocarbon charge with a porous acidic solid catalyst at elevated temperatures in the range of 850° to 1000° F. to yield the desired lower boiling liquid product of greater value than the liquid charge (e.g. motor gasoline) together with normally gaseous hydrocarbons and coke as byproducts. Hydrocracking employs a porous acidic catalyst similar to that used in the catalytic cracking but associated with a hydrogenation component such as metals of Groups VI and VIII of the Periodic Table. An excess of hydrogen is supplied to the hydrocracking reactor under superatmospheric pressure at lower temperatures than those characteristic of catalystic cracking, say about 650° F.

Since the introduction of zeolite catalysts as exemplified by U.S. Pat. No. 3,140,249, a large proportion of the capacity for catalytic cracking and hydrocracking has been converted to use of such highly active catalysts. The high activity zeolite catalysts are characterized by very low content of alkali metal. Sodium, for example, is present as a cation in synthetic faujasites by reason of their manufacture. Expensive ion exchange operations are carried out in the preparation of cracking and hydrocracking catalysts from synthetic faujasite to replace the sodium or other alkali metal by protons or poly-valent metal cations, especially rare earth metal cations.

It has been recognized that such zeolites can function as catalysts when containing a moderate percentage of sodium. Thus, U.S. Pat. No. Re. 26,188 to Kimberlin, et al. exhibits data showing cracking activity of a faujasite from which only one-third of the sodium has been removed by ion exchange. The extremely high activity of such catalysts as zeolite ZSM-5 has been moderated for specialized purposes by using the zeolite in the partially sodium form. See, for example, U.S. Pat. No. 3,899,544.

Zeolite ZSM-5 preparation is described in U.S. Pat. No. 3,702,886 which also describes several processes in which the zeolite is an effective catalyst, including cracking and hydrocracking. That zeolite is shown to be prepared from a forming solution which contains organic cations, namely alkyl substituted ammonium cations. Those large organic cations then occupy cationic sites of the zeolite and block pores at least partially. The conventional method for removing the organic cations is to burn them out with air at elevated temperature, leaving a proton at the site previously occupied by the organic cation. Sodium, or other alkali metal, at other cationic sites may then be ion exchanged to provide protons or multivalent metals as desired to prepare catalysts for cracking, hydrocracking and other purposes.

The acid activity of zeolite catalysts is conveniently defined by the alpha scale described in an article published in *Journal of Catalysis*, Vol. VI, pp 278-287 (1966). In this test, the zeolite catalyst is contacted with hexane under conditions prescribed in the publication and the amount of hexane which is cracked is measured. From this measurement is computed an "alpha" value which characterizes the catalyst for its cracking activity for hexane. The entire article above referred to is incorporated herein by references. The alpha scale so described will be used herein to define activity levels for cracking n-hexane. And, in particular, for purposes of this invention, a catalyst with an alpha value of less than about 10 and preferably less than about 1 will be considered to have substantially little activity for cracking n-hexane.

The shape selective catalysis of zeolites is defined by the Constraint Index scale described in an article published in the *Journal of Catalysis*, Vol. 67, pp 218-222 (1981). In this test, the zeolite catalyst is contacted with a mixture of hexane and 3-methylpentane under conditions set forth in the publication and the amount of hexane and 3-methylpentane cracked is measured. From this measurement a constraint index value is computed which is related to the ability of the zeolite for shape selective catalysis. The entire article above is incorporated herein by references. The contraint index scale so described will be used herein to describe the ability of zeolite for shape selective catalysis.

U.S. Pat. No. 4,247,388 to Banta, et al. discloses that the catalytic performance of certain acidic zeolites such as those of the ZSM-5 type in hydrodewaxing operations is improved by controlling the alpha activity of such zeolites to within the range of 55-150, e.g., by treatment with steam.

U.S. Pat. No. 4,284,529 to Shihabi discloses improvements in pour point reduction by means of catalytic dewaxing employing a catalyst prepared from a ZSM-5 type zeolite having a constraint index of about 1 to 12. This dewaxing process employs a low acidity form of zeolite such as ZSM-5 or ZSM-11 in which the low acidity is imparted by steaming the zeolite to reduce its cracking acitivity to an alpha value of not less than about 5, followed by base ion exchange with an alkali metal cation to reduce the alpha value to not greater than 1.0. A preferred catalyst is referred to therein as a presteamed Na ZSM-5 and is employed to dewax crude oils and other waxy feedstocks in the presence or absence of added hydrogen. These catalysts are effective at start-of-run temperature of about 640° F. and exhibit excellent aging behavior in the presence of hydrogen. However, in the absence of hydrogen these catalysts exhibit a gradual aging requiring a daily increase of about 1°-10° F. in the reaction temperature. Dewaxing processes conducted with presteamed sodium ZSM-5 in the absence of hydrogen exhibit, on the average, cycle times of several weeks between catalyst regenerations because of catalyst aging.

The presteamed base exchanged catalyst disclosed in U.S. Pat. No. 4,289,529 is particularly suited to reducing the pour point of waxy crude oils. This catalyst is especially resistant to the metals, nitrogen and sulfur often associated with crude oils and it does not cause the formation of appreciable quantities of $C_3$ gaseous products so that the liquid recovery from crude dewaxing is often 98% or better. Ideally, crude oil dewaxing should be practiced at well-head so as to permit easy transporting of the dewaxed crude by pipeline. Where an economical source of hydrogen is available, the above described process is commercially feasible. However, practicing this process without a source of hydrogen could be economically attractive if the cycle times between catalyst regenerations are sufficiently long.

SUMMARY OF THE INVENTION

It has now been very surprisingly discovered that the dewaxing process of U.S. Pat. No. 4,284,529 can be significantly improved especially as applied to a feed having a relatively high content of poisonous compounds such as nitrogen as in Shengli or Nigerian gas oil, shale gas oil, etc., or a feed relatively high in both nitrogen and oxygen components, e.g., coker gas oil or a whole crude, such as Taching crude, by employing as catalyst for said dewaxing, a composition obtained by the proces which comprises steaming a precursor crystalline aluminosilicate in the hydrogen or ammonium form having a silica-alumina ratio greater than 12, a constraint index between about 1 and about 12 and an alpha value greater than about 20 in the presence of ammonia to provide a crystalline aluminosilicate having an alpha value of from about 10 to about 150 and thereafter ion-exchanging the steamed precursor with an alkali metal cation under conditions effective to further reduce the alpha value of the crystalline aluminosilicate to less than about 10.

A catalyst prepared in accordance with this invention possesses enhanced stability characteristics for nitrogen, sulfur and oxygen compounds as compared with the catalyst of U.S. Pat. No. 4,284,529 and related catalysts and permits cracking processes to be carried out at lower temperatures with or without added gas such as hydrogen.

In addition to its usefulness in dewaxing, a catalyst prepared in the aforedescribed manner is also useful for catalyzing a variety of other petroleum/hydrocarbon conversions such as up-grading Fischer-Tropsch products, producing xylene from a mixture of ethyl benzene, paraffins and xylene isomers and up-grading naphtha to higher octane products. Furthermore, in petroleum conversions where hydrocracking, hydrofining and/or isomerization is desired, the aforedescribed catalyst can be associated with a hydrogenation component consisting of metals of group VI and VIII of the Periodic Table.

The catalyst used in the present invention is a low acidity form of a class of zeolites which have been found to be extremely active in the acid form. In that form the cationic sites are occupied by protons introduced by ion exchange with an acid or an ammonium (including substitued ammonium) cation which is then decomposed by heat to a proton. Alternatively at least a portion of the cationic sites may be occupied by polyvalent metals. For use in the present invention, these very high acidities inherent in zeolites, such as zeolite ZSM-5, are drastically reduced. Preferably, the acidity is reduced by extensive ion exchange with lithium, sodium or other alkali metal. The invention may also be practiced with such zeolites of very high silica/alumina ratio or by steaming of the active form of the zeolite. It will be recognized by those skilled in the art of zeolite catalysis that substitution of sodium or like cation and steaming are generally recognized as means to "poison" a zeolite catalyst by severely impairing its activity. These agencies are generally avoided in preparation and use of zeolite catalysts in cracking or hydrocracking.

In a particular embodiment of this invention, a zeolite having the above described characteristics and an alpha value greater than about 20 is converted to a low acidity catalyst by contact with steam and ammonia at a temperature of about 600° F. to about 2,000° F. and at a pressure of from about subatmospheric to about 1,000 psig, preferably at a temperature of from about 800° F. to about 1,200° F. and a pressure of from about atmospheric to about 500 psig for a period of time effective to provide an alpha value of from about 10 to about 150 and preferably from about 20 to about 120. The concentration of ammonia can vary from about 1 ppm to about 30%, and preferably from about 0.1% to about 20%, by weight of the total steam-ammonia mixture. The zeolite steamed in the presence of ammonia in accordance with the foregoing procedure is then base exchanged with alkali metal cations to an extent effective to reduce its alpha value to less than about 20, preferably less than about 5 and most preferably less than about 1. In essence, base exchange is conducted under conditions which substantially eliminate the activity of the zeolite for cracking n-hexane although a catalyst with an alpha value even below 0.1 can have some residual activity for n-hexane cracking. However, this residual activity is so small compared with the more highly acidic forms of the same catalyst as to warrant the characterization "substantially eliminated." Alkali metal cations, preferably lithium and sodium, are particularly effective for this purpose. Catalysts prepared by the particular procedure just described are highly efficient for dewaxing, and especially for dewaxing crude oils. In such service, the catalyst is effective as start-of run temperatures of about 640° F. or even less, and exhibit excellent aging behavior and, as a consequence, long cycle life.

In general, the catalysts used in accordance with this invention are crystalline zeolites having a silica/alumina ratio greater than 12 and a Constraint Index (C.I.) between about 1 and about 12. The zeolites are generally termed ZSM-5 type zeolites. These zeolites and their use as dewaxing catalysts are described in U.S. Pat. Nos. 4,149,960 and 4,284,529. The entire contents of both are incorporated by reference herein.

The preferred class of zeolites defined herein are ZSM-5 type zeolites as exemplified by ZSM-5, ZSM-11, ZSM-12, ZSM-35, ZSM-38, with ZSM-5 being particularly preferred.

ZSM-5 is more particularly described in U.S. Pat. No. 3,702,886, the entire contents of which are incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

The zeolites used according to the invention have low alpha values, less than about 10. Preferably, the alpha value is less than unity. As noted, the low acid activity may be achieved by using zeolites of very high silica/alumina ratio or by severe high temperature steaming of zeolites having lover silica/alumina ratio, for example zeolite ZSM-5 of ratio 40 may be treated with 90% steam-10% ammonia at 1200° F. and atmospheric pressure for a period of time (several hours) adequate to reduce the acid activity to the necessary level.

Preferably, the low acidity is achieved by extensive ion exchange of the steam and ammonia treated zeolite with sodium or other alkali metal cation. Silica/alumina ratios in the range of 12 to aluminum free will generally characterize the zeolites preferred in this form of the invention. Particularly preferred zeolites may be in silica/alumina range of 20–2000. It is found that the sodium forms of the zeolites usually are less efficient for dewaxing than are the acid forms but give better overall results measured as conversion, particularly since the conversion products are low in gaseous hydrocarbons. In the embodiment of this invention wherein steaming is combined with base exchange, i.e., by steaming to reduce the alpha value by at least 10 units but not below an alpha value of about 10 followed by base exchange with an alkali metal under conditions effective to substantially reduce hexane cracking activity, the zeolite catalyst has high activity for dewaxing as measured by its effectiveness at temperatures in the range of about 650° F. to about 800° F.

Sodium content of the zeolites will vary inversely with the silica/alumina ratio since it is the aluminum atoms which provide cationic sites suitable for acceptance of the alkali metal ion.

In preferred forms of the invention, the zeolite contains no hydrogenation metal component. Therefore, dewaxing processes can be carried out in the presence or absence of added gas. Thus the preferred catalyst is a presteamed, ammonia-treated sodium exchanged ZSM-5 zeolite. These low acidity alkali metal zeolites are prepared by ion exchange of the zeolite with an aqueous solution of an alkali metal salt or hydroxide at moderate pH values. In the following examples, care was taken to assure nearly complete ion exchange. Thus the observed activity appears truly representative of low acidity zeolites.

Although the process of the invention may be practiced in the absence of added gas, it is preferred that gas be added to the process. Such gases as hydrogen, $C_1$–$C_3$ hydrocarbons or mixtures thereof may be employed. Therefore, gaseous hydrocarbons, such as methane, associated with crude oil may be employed.

In on-site whole crude upgrading the process may be conducted in the presence of methane which may be supplied per se or provided as part of the gaseous hydrocarbons existing in the downhole formation with the crude oil and which are produced together with the crude oil at the well head. When operated in this fashion, i.e., under methane pressure, it is preferred to operate by the trickle technique with methane flowing concurrently downward with mixed vapor and liquid phase hydrocarbons.

Temperature of the reaction is between 600° F. and 850° F. depending on the feed. However, with the particular catalyst utilized herein which is prepared by steaming to an alpha value of not less than about 10 followed by base exchange with alkali to an alpha value of less than about 10, satisfactory activity has been found at temperatures less than 700° F. Many charge stocks will undergo some thermal cracking at temperatures above about 800° F. with resultant production of undesired gaseous hydrocarbons thereby losing one advantage of the invention to the extent that thermal cracking takes place.

Pressures employed will vary according to the technique being used. For liquid full reactor operation, the minimum pressure will be that necessary to maintain the charge in liquid phase at the temperature of reaction. In any event, the pressure will be above about 200 psi. There appears to be no maximum pressure limit imposed by effectiveness of the catalyst, but costs for capital installation and operation of compressors and the like rise rapidly for pressures in excess of 2,000 psi. When methane or hydrogen or any gas is added to the system, it is preferred to operate below that level for economic reasons. Gas circulation may be maintained at from 0 to 15,000 scf/bbl.

Space velocity will vary somewhat with the type of feed, permitting a higher space velocity for a feedstock which is easily dewaxed.

In general, space velocity will range from about 0.1 liquid volume of hydrocarbon charge per volume of catalyst per hour (LHSV) up to about 5.0 LHSV. For most charge stocks, preferable LHSV will range from about 0.3 to about 1.0

In the examples which follow, Examples 1 to 3 illustrate the dewaxing of Nigerian gas oil (boiling range 540°–870° F.), a feed relatively high in catalyst-inactivating nitrogen.

EXAMPLES 1 TO 3

The hydrogen form of ZSM-5 was contacted with 100% steam at 800° F. for 23 hours to an alpha value of 72 followed by sodium exchange to an alpha of less than 0.5. Nigerian gas oil was processed over this catalyst. The gas oil feed had the following properties:

Hydrogen, wt.% 13.01
Sulfur, wt.% 0.24
Nitrogen, ppm 660
Pour Print, °1—75

TABLE I

|  | Example 1 | Example 2 | Example 3 |
|---|---|---|---|
| Reaction Temp., °F. | 760 | 770 | 780 |
| LHSV | 1.1 | 1.3 | 1.3 |
| Time on Stream, Days | 10 | 16 | 17 |
| System Pressure, psig | 570 | 570 | 570 |
| $H_2$ - Circulation, SCF/BBL | 1,200 | 1,100 | 1,100 |
| Yields, wt. % | | | |
| $C_1$–$C_3$ | 2 | 2 | 3 |
| $C_4$-330° F. | 16 | 15 | 20 |
| 330° F. + | 82 | 82 | 77 |
| 330° F. + Pour Point, °F. | 40 | 35 | 5 |

EXAMPLES 4 AND 5

Substantially the same catalyst steaming procedure as that described in Examples 1 to 3 was employed except that the ammonium form of ZSM-5 was employed generating ammonia in situ during steaming. The steamed, ammonia-treated ZSM-5 had an alpha value of 71 after 23 hours of steaming and following sodium-exchange, had an alpha value of less than 0.5. The Nigerian gas oil of Examples 1 to 3 was processed over this catalyst under the conditions and with the results set forth in Table II as follows:

TABLE II

|  | Example 4 | Example 5 |
|---|---|---|
| Reaction Temp., °F. | 770 | 760 |
| LHSV | 1.52 | 1 |
| Time on Stream, Days | 21 | 26 |
| System Pressure, psig | 550 | 530 |
| $H_2$ - Circulation, SCF/BBL | 1,650 | 2,200 |
| Yields, wt. % | | |
| $C_1$–$C_3$ | 3 | 3 |
| $C_4$-330° F. | 20 | 20 |
| 330° F. + | 77 | 77 |
| 330° F. Pour Point, °F. | 10 | −10 |

The data in Table II clearly demonstrate the superior performance of the low acidity catalyst that was prepared in accordance with the process of this invention.

What is claimed is:

1. In a process for the catalytic dewaxing of a hydrocarbon fraction under catalytic dewaxing conditions wherein the improvement comprises employing as catalyst for said dewaxing a composition obtained from the process which comprises steaming a precursor crystalline aluminosilicate in the hydrogen or ammonium form having a silica-alumina ratio greater than 12, a constraint index between about 1 and about 12 and an alpha value greater than about 20 in the presence of ammonia to provide a crystalline aluminosilicate having an alpha value of from about 10 to about 150 and thereafter ion-exchanging the steamed precursor with an alkali metal cation under conditions effective to further reduce the alpha value of the crystalline aluminosilicate to less than about 10.

2. In a process for the catalytic hydrocracking of a hydrocarbon oil under catalytic hydrocracking conditions wherein the improvement comprises employing as catalyst for said hydrocracking a composition obtained from the process which comprises steaming a precursor crystalline aluminosilicate in the hydrogen or ammonium form having a silica-alumina ratio greater than 12, a constraint index between about 1 and about 12 and an alpha value greater than about 20 in the presence of ammonia to provide a crystalline aluminosilicate having an alpha value of from about 10 to about 150 and thereafter ion-exchanging the steamed precursor with an alkali metal cation under conditions effective to further reduce the alpha value of the crystalline aluminosilicate to less than about 10, said composition being present in association with a hydrogenation component.

3. The process claimed in claim 2, wherein said hydrogenation component consists of metals of group VI and VIII of the Periodic Table.

* * * * *